United States Patent Office 2,749,328
Patented June 5, 1956

2,749,328

HYDROXY-OCTAHYDRO ALDEHYDE FROM DICYCLOPENTENYL ALCOHOL

Edward T. Cline, Wilmington, Del., assignor to E. I. du Pont de Nemours and Company, Wilmington, Del., a corporation of Delaware No Drawing. Application June 25, 1952,
Serial No. 295,567

10 Claims. (Cl. 260—73)

This invention relates to a new class of aldehydes and their acetals.

This application is a continuation-in-part of my copending application, now abandoned, Ser. 236,467, filed July 12, 1951.

Aldehydes as such have long been known in the organic chemical art and, because of their high reactivity with a wide range of organic and inorganic chemicals, have become an industrially important class of compounds. Acetals, including the hemiacetals, particularly with those derived from polyalcohols, have a considerable importance in many and varied fields, including the photographic and fiber arts. For instance, the polyvinyl alcohol acetals of cyclic aldehydes exhibit extremely good overall fiber properties, see for instance the copending application of Cline and Stevenson, Ser. No. 142,537, filed February 4, 1950, now U. S. Patent 2,636,803. However, despite the large overall improvements in fiber properties exhibited by these products over previously known polyvinyl alcohol acetals, more resilient acetal fibers, particularly with higher moisture regain values and sticking points, are desired.

This invention has as an object the preparation of new aldehydes. A further object is the preparation of acetals of such aldehydes. A still further object is the preparation of polyvinyl acetals of such aldehydes. Another object is the preparation of films or fibers comprising the polyacetals, e. g. the polyvinylacetals, of such aldehydes. Still another object is a process for the treatment of polyvinyl alcohol fibers and filaments. Other objects will appear hereinafter.

These objects are accomplished by the invention of hydroxy-substituted polycyclic aldehydes of the formula

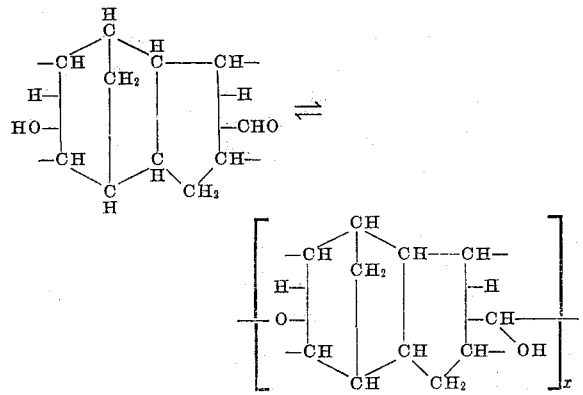

i. e., of octahydro-4,7-methanoindene having on one of the positions 5 and 6 a hydroxy group and on one of the position 1 and 2 a carboxaldehyde, CHO, group, and the acetals of these aldehydes, including the self acetals, but particularly those with polyhydroxyl compounds and especially with polyvinyl alcohol, the latter preferably extended in at least one but not more than two dimensions. These polyvinyl acetals of the new aldehydes have proven to be of very high interest in the fiber field, exhibiting a high degree of resilience, moisture absorption comparable with that of cotton, dyeability, and other sought-for fiber properties.

The production of acid derivatives such as acids, their esters, etc. by the reaction of carbon monoxide with alcohols in the presence of cobalt catalysts, e. g. the chloride, has long been known. See, for example, U. S. 1,946,255, 2,462,738, 2,542,767, etc. Acids and their derivatives have also been prepared by the reaction of olefins with alcohols and carbon monoxide in the presence of cobalt halides, yields up to 90% being attained. See Präparative Organische Chemie (1939–46) 36 127 (Ziegler, Wiesbaden, 1948). It is therefore surprising that the carbonylation of, i. e., the application of the oxo process to, dicyclopentenyl alcohol proceeds smoothly with essentially no byproducts to the new hydroxy-substituted carboxaldehydes of this invention rather than to products wherein the hydroxyl group has been converted to a carboxyl group or derivative thereof. The properties of dicyclopentenyl alcohol, the acid catalyzed hydration product of dicyclopentadiene, are set forth in Rohm and Haas Company Bulletin SP-57 of March 1950 and its preparation in Bruson U. S. Patent 2,385,788. It is to be noted that Bartlett et al., J. Am. Chem. Soc. 68, 6 (1946) indicate dicyclopentenyl alcohol to be more rigorously identified as 5(or 6)-hydroxy-5,6-dihydro-exo-dicyclopentadiene (i. e., 3a,4,5,6,7,7a-hexahydro-4,7-methanoinden-5(or 6)-ol) and that the —OH group is probably in position 5 of these and the foregoing structures.

Because of the fused polycyclic structure of the hydroxyaldehyde and in view of the fact that the two substituents can each be in one of two positions, the product is a mixture of isomers having the above-indicated structural formula with the hydroxyl group in either the five or six position and the carboxaldehyde group in either the one or two position. In addition, because of the relatively high reactivity of the two substituents in acetal formation the mixed hydroxy substituted carboxaldehydes are in equilibrium with the interpolyhemiacetals as indicated by the structural formula above and as evidenced, for example, by molecular weight determinations. Thus the product behaves as a solution of the interpolyhemiacetals in the mixed hydroxy substituted carboxaldehydes. It is this solution or mixture which is used in Examples IV, VII, VIII, IX and X.

The acetals with other alcohols, including mono-, di-, and polyalcohols can be made by various methods, including simple acetal interchange, the latter being of particular utility in the formation of the acetals of polymeric polyalcohols, e. g. polyvinyl alcohol. The acetals of the mono- and dialcohols can be most conveniently prepared by carrying out the process of hydrocarbonylation in the presence of the requisite alcohol or glycol. It is to be noted that, in the presence of a dialdehyde or precursor thereof, the rate of acetal formation particularly in the case of the polyvinyl alcohol surprisingly increases with increasing water content of the acetalization solution, this in spite of the fact that water is formed during the reaction.

The hydrocarbonylation reaction for the preparation of these new hydroxy substituted polycyclic aldehydes can be carried out in any pressure resistant reactor at temperatures ranging from 100 to 250° C. under pressures corresponding to from 50 to 1000 atmospheres hydrogen and 50 to 1000 atmospheres of carbon monoxide in the presence of a suitable oxo process type catalyst such as metallic cobalt and certain of its compounds, e. g. the chlorides, the sulfides, the acetate, the naphthenate, the carbonyl, and the like (see U. S. Patents 2,327,066 and 2,437,600). Usually the reaction is carried out in the range of 100 to 180° C. under pressures in the neighborhood of 200 to 500 atmospheres of hydrogen and 200 to 500 atmospheres of carbon monoxide in a silver-lined pressure resistant reaction vessel using a cobalt carbonyl catalyst (charged as such or prepared in situ) and a reaction medium, containing if desired an added alcohol or glycol—in which case, as pointed out before, the acetal of the alcohol or glycol with the 5- (or 6-) hydroxyoctahydro-4,7-methanoindene-1- (or 2-) carboxaldehyde is prepared.

The following examples in which parts are by weight are illustrative of the invention.

*Example I*

A silver-lined pressure resistant reaction vessel of internal capacity corresponding to 400 parts of water is charged with 96.5 parts of dicyclopentenyl alcohol and one part of cobalt octacarbonyl. The vessel is then closed, evacuated, and pressured to 250 atmospheres with hydrogen and then to 500 atmospheres with carbon monoxide. The reactor is then heated to 140° C. and held at this temperature for four hours during which time a pressure drop of 150 atmospheres is noted. At the end of this time, the reactor is cooled to room temperature, vented to the atmosphere and the product removed. There is thus obtained 117.9 parts (100% of theory) of crude 5- (or 6-) hydroxyoctahydro-4,7-methanoindene-1 (or 2-) carboxaldehyde as a frangible, pale pinkish solid. A portion of the product is freed from the catalyst residue (primarily responsible for the pinkish color) by dissolving in excess chloroform and heating on the steam bath for 40 minutes. During this time a brown precipitate forms in the solution and is removed by filtration. The chloroform solvent is removed from the clear filtrate by distillation under reduced pressure. There is thus obtained relatively pure 5- (or 6-) hydroxyoctahydro-4,7-methanoindene-1- (or 2-) carboxaldehyde as a clear colorless glass presumably a polymeric interhemiacetal of the hydroxyaldehyde. The product is soluble in chloroform and dioxane and insoluble in benzene, ether, and acetone. It dissolves slowly in acidified methanol. On heating the product becomes less viscous and finally at 250–255° C./0.1 mm. Hg flash distills. The distillate on cooling reverts to the colorless glass. It is believed that cracking of low polymer, distillation, and repolymerization occur in this distillation.

*Analysis.*—Calculated for $C_{11}H_{16}O_2$: C, 73.30%; H, 8.95%. Found: C, 73.76%, 73.92%; H, 8.81%, 9.16%. Mol. wt. (cryoscopic) in dioxane: 319; theory 180.

*Example II*

A silver-lined pressure resistant reaction vessel of internal capacity corresponding to 400 parts of water is charged with 75 parts of methyl alcohol, 75 parts of dicyclopentenyl alcohol, and one part of cobalt octacarbonyl. The vessel is then closed, evacuated, and pressured to 200 atmospheres with hydrogen and then to 400 atmospheres with carbon monoxide. The reactor is then heated to 140° C. and held at this temperature for four hours during which time a pressure drop of 140 atmospheres is noted. At the end of this time, the reactor is cooled to room temperature, vented to the atmosphere and the product removed. There is thus obtained 142 parts of crude product. The product is purified by distillation, the fraction boiling at 134–137° C. under a pressure corresponding to 1.2 mm. mercury being taken as a purified dimethylacetal of 5- (or 6-) hydroxyoctahydro-4,7-methanoindene-1- (or 2-) carboxaldehyde. Another sample of the purified, colorless, viscous, oil product, similarly prepared and boiling at 139° C. under a pressure corresponding to 1.0 mm. of mercury, exhibits the following analysis:

*Analysis.*—Calculated for $C_{13}H_{22}O_3$: C, 68.99%; H, 9.80%. Found: C, 69.07%, 68.95%; H, 9.81%, 9.85%.

*Example III*

A silver-lined pressure resistant reaction vessel of internal capacity corresponding to 400 parts of water is charged with 75 parts of diethylene glycol, 75 parts of dicyclopentenyl alcohol, and one part of cobalt octacarbonyl. The vessel is then closed, evacuated, and pressured to 200 atmospheres with hydrogen and then to 400 atmospheres with carbon monoxide. The reactor is then heated to 140° C. and held at this temperature for four hours during which time a pressure drop of 145 atmospheres is noted. At the end of this time, the reactor is cooled to room temperature, vented to the atmosphere and the product removed. There is thus obtained 142 parts of the crude diethylene glycol acetal of 5- (or 6-) hydroxyoctahydro-4,7-methanoindene-1 (or 2-) carboxaldehyde dissolved in the excess diethylene glycol as a pale pink, viscous liquid.

*Example IV*

A solution of 300 parts of polyvinyl alcohol, of molecular weight about 40,000, and 2.8 parts of a solubilized phosphate wetting agent in 1920 parts of water is pressure filtered with air through alternate layers of cloth and cotton batting and pumped with a gear pump at the rate of 4.3 mls. per minute through a 60 hole (0.004 inch hole diameter) precious metal spinneret into a 45% aqueous sodium dihydrogen phosphate coagulating bath at 50° C. The yarn travel in the coagulating bath is 60 inches and the windup of the coagulated yarn on the Godet wheel is at the rate of 33 feet per minute. The yarn is stretched about 5:1 by drawing in a 50% aqueous sodium dihydrogen phosphate solution at 104° C. The drawn yarn is then washed in water and dried under conditions of constant length and then heated in air in a relaxed condition at 215° C. for about three minutes during which time the yarn shrinks about 50%. The heat treated yarn is then contacted with water for ten minutes at 83° C. in a relaxed condition and the water removed from the swollen yarn by soaking in 2B alcohol for 15 minutes at 25° C. The thus conditioned yarn is then immersed in a relaxed condition for 75 minutes at 130° C. in 25 times its weight of a solution made up from 300 parts of crude 5- (or 6-) hydroxyoctahydro-4,7-methanoindene-1- (or 2-) carboxaldehyde and five parts of malondialdehyde tetraethylacetal (the latter serving to stabilize the fibers to boiling water) dissolved in 53 parts of 92% aqueous orthophosphoric acid and 640 parts of diethylene glycol. At the end of this acetalization step, the treated yarn is washed in a relaxed condition successively in 2B alcohol, 5% aqueous sodium bicarbonate solution, and water. The washed yarn is then heated in a relaxed condition for one hour at 100° C. in an aqueous solution containing 0.1% of sodium carbonate and 0.1% of a commercial fatty alcohol sulfate detergent, during which period the yarn shrinks 8% in length. During the above acetalization procedure, the yarn increases 60% in weight, corresponding to acetalization of 32.6% of the polyvinyl alcohol hydroxyls, and becomes appreciably more resilient and water insoluble. The following data indicate the improvement in properties engendered by this acetalization treatment:

| Yarn | Behavior in Boiling water | Work Recovery, 3% Stretch | Moisture Regain at 87% R. H., 23° C. | Sticking Point, ° C. |
|---|---|---|---|---|
| | | Percent | Percent | |
| Polyvinyl alcohol | soluble | 15 | | 225 |
| Polyvinyl alcohol yarn treated with formaldehyde. | insoluble | 20 | 6 | 220 |
| Polyvinyl alcohol yarn treated with p-tolualdehyde.[1] | ...do | 52 | 3 | 207 |
| Polyvinyl alcohol yarn treated as in the above example. | ...do | 45 | 10.2 | >240 |

[1] As disclosed and claimed in the copending application of Cline et al., Ser. No. 142,537, filed February 4, 1950, now U. S. Patent 2,636,803.

Example V

Yarn is prepared from a highly linear polyvinyl alcohol of molecular weight approximately 40,000 in a manner similar to that described previously in Example IV except that the heat treatment in air is at 220° C. and the water swelling is carried out at 90° C. A sample of the thus conditioned yarn is then immersed in a relaxed condition for 105 minutes at 135° C. in about 25 times its weight of a solution made up from 180 parts of crude (54% pure) diethylene glycol acetal of 5- (or 6-) hydroxyoctahydro-4,7-methanoindene-1- (or 2-) carboxaldehyde, 26.6 parts of 92% aqueous orthophosphoric acid and 575 parts of diethylene glycol. At the end of this acetalization step, the treated yarn is washed as described in detail previously in Example IV. During the one hour boil-off therein described, samples of this washed treated yarn shrink 5.2% in length. During this acetalization procedure, the yarn increases 73% in weight, i. e., the polyvinyl acetal weighs 73% more than the starting polyvinyl alcohol yarn, i. e., 39.6% of the polyvinyl alcohol hydroxyls are acetalized. The properties of the treated yarn are essentially the same as those given previously in Example IV, i. e., the yarn is water insoluble and appreciably more resilient as compared with the starting polyvinyl alcohol yarn.

Example VI

Fibers are prepared from a polyvinyl alcohol of molecular weight about 40,000 and pretreated as described in detail previously in Example IV. A sample of the treated fibers is then immersed in a relaxed condition for 50 minutes at 130° C. in about 25 times its weight of a solution made up from 106 parts of purified 5- (or 6-) hydroxyoctahydro-4,7-methanoindene-1- (or 2-) carboxaldehyde dimethylacetal and 1.7 parts of malondialdehyde tetraethylacetal (see Example IV) dissolved in 35.4 parts of 92% aqueous orthophosphoric acid and 649 parts of diethylene glycol. At the end of the acetalization step, the treated yarn is washed, boiled off, and dried as previously described in Example IV. During the boil-off the yarn shrinks 7.7% in length. As a result of this acetalization procedure, the yarn increases 66.5% in weight, i. e., the polyvinyl acetal thus formed weighs 66.5% more than the starting polyvinyl alcohol, i. e. 36.1% of the polyvinyl alcohol hydroxyls are acetalized. The properties of the polyvinyl acetal yarn are similar to those previously described in Example IV, i. e., the yarn is insoluble and appreciably more resilient than the starting polyvinyl alcohol yarn.

Example VII

A solution of 200 parts of polyvinyl alcohol of molecular weight about 26,000 and 1.6 parts of a solubilized phosphate wetting agent in 942 parts of water is pressure filtered and wet-spun as described previously in Example IV, varying in that the solution is pumped at a rate of 2.2 ml./min. and the coagulated yarn is wound up on the Godet wheel at a rate of 23.5 ft./min. The yarn is then stretched about 5.5:1, washed and dried, and finally heated in a relaxed condition at 213° C. as described in Example IV, during which process this yarn shrinks about 34%. The heat-treated yarn is contacted with water as described in Example IV for ten minutes at 82° C. and finally immersed, after alcohol soaking, in a relaxed condition for 59 minutes at 140° C. in 30 times its weight of a solution made up from 150 parts of crude 5- (or 6-) hydroxyoctahydro-4,7-methanoindene-1- (or 2-) carboxaldehyde and six parts of diethoxytetrahydrofuran (the latter serving to stabilize the fibers to boiling water as does the malondialdehyde tetraethylacetal used in Example IV), dissolved in 27 parts of 92% aqueous orthophosphoric acid, 648 parts of diethylene glycol, and 25 parts of water. At the end of this acetalization the yarn is treated as described previously in Example IV. This particular yarn sample during the boil-off does not change in length. The final yarn thus obtained has increased 69% in weight, i. e., 37.5% of the polyvinyl alcohol hydroxyls are acetalized, and is insoluble in boiling water and appreciably more resilient and exhibits a work recovery of 60% from 3% stretch.

Example VIII

A solution of 300 parts of polyvinyl alcohol of molecular weight about 40,000 and 3.2 parts of a solubilized phosphate wetting agent in 2057 parts of water is pressure filtered and wet spun as described in Example IV, varying in that the solution is pumped at the rate of 3.5 ml./min. The yarn is stretched, washed, dried, and heat-treated in air as described in Example IV except that a temperature of 217° C. is used in the heat treatment during which the yarn shrinks about 43%. Skeins of the heat-treated yarn are immersed for 10 minutes in water at 86° C. The water is replaced with methanol and the skeins are immersed in various acetalization solutions having compositions shown in the table below. The solutions are refluxed for 90 minutes except that skein D is refluxed only 21 minutes. The skeins are removed and treated as described in Example IV except that some are not boiled off.

|   | Composition of Acetalization Solution (Weight Percent) | | | | | Yarn Weight Gain (Percent) | | Yarn Shrinkage in Boil-Off (Percent) |
|---|---|---|---|---|---|---|---|---|
|   | $CH_3OH$ | $H_2SO_4$ | DETF [1] | HOMIC [2] | $H_2O$ | Treated [3] | Boiled Off | |
| A | 54 | 0.54 | 0.22 | 45.4 | 0 | 46.1 (25) | | |
| B | 52 | 0.53 | 0.21 | 44.0 | 2.8 | 65 (35.3) | | |
| C | 51 | 0.52 | 0.20 | 43.0 | 5.4 | 76 (41.3) | 76 | 6 |
| D | 35 | 0.56 | 0.22 | 52 | 11.7 | 105 (57.1) | | |
| E | 48 | 0.49 | 0.40 | 41 | 10.2 | 100 (54.3) | | |
| F | 48 | 0.49 | 0.79 | 41 | 10.2 | 82 (44.5) | 78 (42.4) | 5.8 |
| G | 48 | 0.49 | 0.98 | 41 | 10.2 | 59 (32.1) | | |
| H | 45 | 0.47 | 0.93 | 39 | 14.5 | 70 (38.1) | 70 | 1.2 |
| I | 45 | 0.47 | 1.49 | 39 | 14.6 | 63 (34.2) | 57 (31) | 1.7 |

[1] "DETF" is Diethoxytetrahydrofuran.
[2] "HOMIC" is 5- (or 6-) hydroxyoctahydromethanoindene-1- (or -2-) carboxaldehyde.
[3] The figures in parentheses indicate the percent of the polyvinyl alcohol hydroxyls acetalized.

The letters A to I identify the skeins treated. Skeins C, F, and H had work recoveries, from 3% elongation, of 45%, 50%, and 56%, respectively.

As can be seen the rate of acetalization varies with both the water and diethoxytetrahydrofuran concentrations. When the diethoxytetrahydrofuran concentration is kept constant as for skeins A, B, C, and D and the water concentration is varied, the rate of reaction increases with increasing water content. When the water concentration is kept constant as for skeins E, F, and G and the diethoxytetrahydrofuran concentration is varied, the rate of reaction decreases with increasing diethoxytetrahydrofuran content. It is to be noted that even in the case of skeins H and I, which were treated at higher water concentrations than the others, the upper limit of water concentration beyond which the reaction rate decreases with increasing water content has not been reached. The increase in reaction rate with increasing water content is unexpected, particularly because water is a product of the acetalization reaction. It is to be noted that quite surprisingly very small quantities of water of the order of 2–3% by weight of the acetalization solution cause large increases (almost 20% absolute and over 40% relative) in the amount of acetal links formed as evidenced by weight gain—see data on skeins A and B in the foregoing table.

Furthermore, water not only increases the rate of the reaction but also has another beneficial effect in that it minimizes discoloration of the fibers. At the higher water concentrations the fibers are essentially colorless when the processing is completed; whereas, at the lower concentration or in the absence of added water the products have some color. This is particularly the case when diethylene glycol is used as the solvent and the acetalization is carried out at high temperatures as in the other examples dealing with fiber treatments.

*Example IX*

A skein of yarn which had been spun and pretreated exactly as in Example VIII is acetalized at 123° C. for 30 minutes in a solution containing 33% by weight of 5- (or 6-) hydroxyoctahydromethanoindene-1 (or -2-) carboxaldehyde, 0.79% diethoxytetrahydrofuran, 12.2% $H_2O$, 2.2% $H_3PO_4$ (92%) and 52% diethylene glycol. The treated yarn is removed and further processed as in Example IV. Gain in weight before and after boil-off is 71% (38.5% acetalization of polyvinyl alcohol hydroxyls) and 67% (36.4% acetalization of polyvinyl alcohol hydroxyls), respectively, and the shrinkage during boil-off is 1%. The rapid rate of reaction relative to those in Examples IV, V, and VI is noteworthy. The boiled-off fibers are essentially colorless and have a work recovery from 3% elongation of 54%.

*Example X*

A 1000 filament tow is spun from the same polymer as that described in Example IV under essentially equivalent conditions of spinning and stretching. Following washing and drying at fixed length the tow is cut to 4.5 inch staple. The staple is heat treated in air, immersed in hot water as described in Example VIII, and allowed to dry in air. A sample of the thus conditioned staple is acetalized for 45 minutes at 130° C. in about 25 parts of a solution containing by weight 31% of 5- (or 6-) hydroxyoctahydromethanoindene-1- (or -2-) carboxaldehyde, 0.60% diethoxytetrahydrofuran, 15.6% water, 2.1% orthophosphoric acid (92% concentration), and 51% diethylene glycol. The treated staple is removed and processed as in Example IV. The gain in weight before and after boil-off is 89% and 83%, respective, i. e., 48.4% and 45.1%, respectively, acetalization of polyvinyl alcohol hydroxyls. The rapid rate of reaction relative to those given previously in Examples IV, V, and VI is noteworthy and the boiled-off, treated fibers are essentially colorless.

Another sample of the conditioned staple is similarly acetalized for 45 minutes at 130° C. in a solution containing by weight 32% of 5- (or 6-) hydroxyoctahydromethanoindene-1- (or -2-) carboxaldehyde, 0.63% diethoxytetrahydrofuran, 12.2% water, 2.2% orthophosphoric acid (92% concentration), and 53% diethylene glycol. The treated staple is then removed from the acetalization bath and further processed as in Example IV. The gain in weight before and after boil-off is 71% and 67%, respectively, i. e., 38.6% and 36.4%, respectively, acetalization of polyvinyl alcohol hydroxyl. The fiber after boil-off had a work recovery from 3% elongation, of 63%. The rapid rate of reaction relative to those given previously in Examples IV, V, and VI is noteworthy and the boiled-off, treated fibers are essentially colorless.

The hydrocarbonylation is carried out in the absence or presence of a solvent, e. g. of alcohols, including glycols and higher polyalcohols, having hydroxyl hydrogen as their only Zerewitinoff active hydrogen. When these alcohols, including polyhydric alcohols, are present, the product obtained is the corresponding acetal of the 5- (or 6-) hydroxyoctahydro - 4,7 - methanoindene-1- (or 2-) carboxaldehyde. Particular examples of these alcohols or glycols or higher polyalcohols include: primary monoalcohols, e. g. methyl, ethyl, propyl, butyl, benzyl, dodecyl, and octadecyl alcohols; secondary monoalcohols, e. g. isopropyl, isobutyl, and isoamyl alcohols; glycols, e. g. ethylene, propylene, hexamethylene, and decamethylene glycols; polyhydric alcohols, e. g. glycerol, mannitol, sorbitol; heterocyclic alcohols, e. g. tetrahydrofurfuryl alcohol; substituted alcohols, e. g. p-chlorobenzyl alcohol, p-bromobenzyl alcohol, and the like. Of these various alcohols, for reasons of readier availability and lack of concomitant side reactions, it is preferred to use those alcohols which other than the alcoholic hydroxyls are solely hydrocarbon. Especially preferred of these, for reasons of their greater utility in acetal interchange reactions with the polymeric polyalcohols, are the lower molecular weight, saturated aliphatic hydrocarbon alcohols containing no more than three carbons per hydroxyl group and preferably no more than two hydroxyl groups. The alkanols of up to three carbons and the glycols of up to six carbons are preferred.

As has already been illustrated by Examples IV to X, the new products of this invention, i. e., the mixture of isomers corresponding to the molecular structure

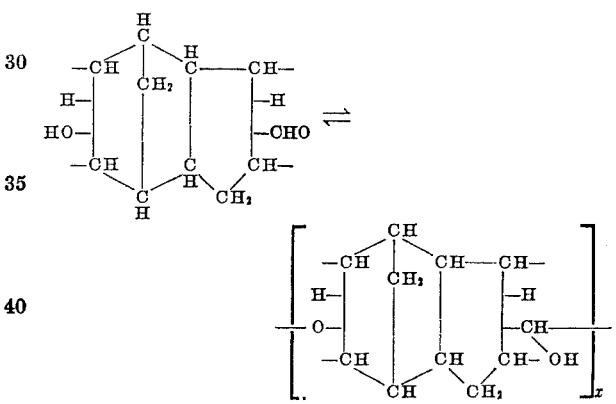

and their acetals are useful in the treatment of synthetic linear polymers having a plurality of hydroxyl groups directly attached to the main carbon chain, said polymers consisting to the extent of at least 90% by weight of vinyl alcohol, i. e., —$CH_2$—CHOH—units, and in which at least 45% of the carbon atoms of the polymer chain are attached to hydroxyl groups, particularly with such macromolecular polymers in the form of oriented fibers. Such polymers, when treated with the products of this invention until at least 25% but not more than 75% of the hydroxyl groups in the polyvinyl alcohol have combined with the products of this invention through the carboxaldehyde group in the form of acetal linkages are water-insoluble and exhibit good resilience (i. e., high work recovery), good moisture regain and a high stacking point.

Preferably, the synthetic linear oriented hydroxylated polymers consist solely of polyvinyl alcohol, but the latter can also contain, in combined form, very minor proportions, below 10% and preferably no more than 2–5% by weight, of another monounsaturated vinylidene monomer. The presence of this in such low amounts does not substantially modify the characteristics of polyvinyl alcohol. For example, commercial polyvinyl alcohol sometimes contains low proportions of the non-hydrolyzed ester, e. g., polyvinyl acetate, from which it is prepared. There can also be used hydrolyzed copolymers of vinyl esters with very low proportions of vinylidene compounds such as ethylene, methyl methacrylate, vinyl chloride, and the like.

By "oriented fiber" is meant, as usual, a fiber which has been drawn under tension to an extent such that it shows a typical fiber X-ray diffraction pattern. In general, oriented fibers are obtained when the polyvinyl alcohol filament polymer is stretched at least 300% of its initial length. Polyvinyl alcohol filaments can be drawn in a hot salt bath, e. g., a boiling concentrated solution of sodium dihydrogen phosphate; or they can be drawn in hot oil, or in air at temperatures between 200 and 250° C. Preferably, the filament is drawn to the maximum length short of the breaking point, e. g., with a draw ratio between 3:1 and 11:1, depending on the filament and the drawing conditions. This operation increases the tensile strength of the filament considerably. Various methods of preparing oriented polyvinyl alcohol fibers have been published.

By "macromolecular" is meant a polymer having a degree of polymerization, i. e., a number of recurring units, of at least 100 and preferably at least 250 for best fiber properties.

Spinning of the polyvinyl alcohol into filaments may be accomplished by any of the known methods including dry or evaporation spinning. Wet spinning into an aqueous salt bath, e. g., a concentrated sodium dihydrogen phosphate bath, is a preferred method. The fiber may then be oriented by stretching in a hot salt bath, followed by washing and drying at fixed length to prevent shrinkage and sticking of the filaments; or it may be partially stretched in air or in a liquid medium at ordinary temperature, followed by washing, drying at fixed length and finally stretching in air or a nonsolvent liquid medium at 200–240° C. to complete the orientation.

Thus the present invention affords a new class of polyvinyl alcohol/polyvinyl acetal copolymers exhibiting superior fiber properties over those hitherto known. Specifically, these new copolymers exhibit sticking points more than 30° C. higher than representative polyvinyl alcohol/polyvinyl acetal copolymers wherein the aldehyde forming the acetal groups is mononuclear (as described in detail in the copending Cline et al., U. S. Patent 2,636,803), and more than 20° C. higher than the sticking point of similar copolymers previously known in the art where the aldehyde forming the acetal groups is formaldehyde. The higher sticking point of the new products of this invention is significant since it affords an appreciably greater margin of safety in ironing of fabrics prepared from these yarns. In addition, yarns prepared from the new polyvinyl alcohol/acetal copolymers of this invention exhibit moisture regains at 87% relative humidity at 23° C., more than three times as great as the corresponding products of the copending Cline et al. application, supra, and twice as high as that exhibited by the previously known polyvinyl alcohol/formaldehyde copolymers. This higher moisture regain is also significant since fabrics prepared from such yarns exhibit lower static and greater bodily comfort when used in the important wearing apparel outlets. Finally, the yarns prepared from the polyvinyl alcohol/polyvinyl acetal copolymers of this invention exhibit work recoveries as high as three times greater than the previously known polyvinyl alcohol/formaldehyde copolymers and in some instances even higher than the corresponding figures for the polyvinyl acetal copolymers of the copending Cline et al. application, supra.

The acetals of 5- (or 6-) hydroxyoctahydro-4,7-methanoindene-1- (or -2-) carboxaldehyde with simple mono- or polyfunctional alcohols can be prepared by heating the hydroxy substituted carboxaldehyde directly with the requisite alcohol either alone or in the presence of an inert solvent such as a hydrocarbon ether, the aromatic hydrocarbons or the halogenated hydrocarbons. There is preferably present in the acetalization step one or more of the acidic catalysts by now well recognized in the art for acetalization reactions. Suitable examples of such catalysts include the mineral acids, e. g., sulfuric and phosphoric; organic acids such as oxalic, maleic, citric, and p-toluenesulfonic acids; acidic inorganic salts such as ammonium chloride, zinc chloride, calcium chloride, sodium bisulfate; inorganic acid anhydrides such as boron trifluoride, either as such or in the form of its hydrate or etherate, and the like. At the end of the acetalization reaction, which generally requires about 10 minutes to 20 to 24 hours or longer depending upon the temperature at which the reaction is carried out and varying from room temperature to 150° C. or higher, with the lower temperatures obviously requiring longer times, the catalyst is neutralized or removed, e. g., by washing, and the desired simple acetal of 5- (or 6-) hydroxyoctahydro-4,7-methanoindene-1- (or 2-) carboxaldehyde purified by washing with suitable solvents, or by fractionation, preferably under vacuum, if it is volatile. The rate of acetal formation and the yield in the case of these simple alcohols are increased if the water resulting from the acetal formation is removed from the reaction zone as formed. A convenient way of doing this involves the use of one of the inert reaction media mentioned previously and the removal of the water by azeotropic distillation, preferably with the condensate, after gravity separation of the water, being passed through a bed of drying agent, e. g., anhydrous calcium sulfate, prior to being returned to the reaction zone.

Alternatively, the simple acetals of 5- (or 6-) hydroxyoctahydro-4,7-methanoindene-1- (or 2-) carboxaldehyde can be prepared by acetal interchange carried out as described above for the direct acetalization substituting an acetal of the desired alcohol for the alcohol, e. g., methylal for methanol, and the like. Acetal interchange occurs, forming the desired acetal of the simple alcohol with 5- (or 6-) hydroxyoctahydro-4,7-methanoindene-1- (or 2-) carboxaldehyde and the aldehyde of the starting simple acetal. As in the case of the direct acetalization, the rate and yields of the desired simple 5- (or 6-) hydroxyoctahydro-4,7-methanoindene-1 (or 2-) carboxaldehyde acetals are increased if the by-product of the reaction, i. e., the simple aldehyde fragment of the starting acetal, is removed from the reaction zone continuously as formed.

When it is desired to form 5- (or 6-) hydroxyoctahydro-4,7-methanoindene-1- (or 2-) carboxaldehyde acetals of polymeric polyhydric alcohols, e. g., polyvinyl alcohol or vinyl alcohol copolymers, particularly in the form of oriented fibers, reaction conditions are chosen such that the fibrous structure is preserved. Prior to the acetalization, the fibers are relaxed in a hot non-solvent medium and activated in hot water as described in detail in the copending application of Cline et al. Ser. No. 142,537, filed February 4, 1950, now U. S. Patent 2,636,803. The acetalization reaction can be carried out in the absence of a solvent if enough of the 5- (or 6-) hydroxyoctahydro-4,7-methanoindene-1- (or 2-) carboxaldehyde or its simple acetals is used to insure good contact with the yarn. However, the nature of these 5- (or 6-) hydroxyoctahydro-4,7-methanoindene-1- (or 2-) carboxaldehyde acetals, which range from viscous liquids to semi-solid glasses, and the excessive shrinkage generally experienced in the fibers when acetalization is carried out in the absence of the solvent, make it preferable to carry out the reaction in an inert, liquid, organic solvent for the 5- (or 6-) hydroxyoctahydro-4,7-methanoindene-1- (or 2-) carboxaldehyde self hemi-acetal or simple alcohol acetal thereof which is inert with respect to the fibers.

Suitable examples of such carbonyl-free liquid organic media include the monohydric or dihydric saturated aliphatic alcohols or ether alcohols of one to six carbon atoms hydrocarbon but for oxy oxygen, e. g., methanol, ethanol, propanol, butanol, hexanol, ethylene and diethylene glycols, methoxyethanol, butoxyethanol, etc., or any other non-oxocarbonyl solvent such as the simple hydrocarbon ethers, linear or cyclic, e. g., dibutyl ether, tetrahydrofuran, dioxane, diethylene glycol, diethyl ether, and the like. A small amount of acid such as the simple mineral acids is necessary in some cases to effect solution when 5- (or 6-) hydroxyoctahydro-4,7-methanoindene-1- (or 2-) carboxaldehyde interpolyhemi-acetal is used.

The concentration of the 5- (or 6-)hydroxyoctahydro-4,7-methanoindene-1- (or 2-) carboxaldehyde simple acetal or interpolyhemi-acetal can vary over wide limits. At low concentrations, e. g., of the order of 0.5% by weight of the acetalization solution, the reaction is slow. At higher concentrations the reaction proceeds more rapidly and such conditions are normally employed. The upper limit of concentration of the 5- (or 6-) hydroxyoctahydro-4,7-methanoindene-1- (or 2-) carboxaldehyde or derivative used is determined by solubility and viscosity factors and can be as high as 70% in the case of good solvents such as methanol.

The acetalization solution also contains an acetalization or acetal interchange catalyst of the type previously described. In the case of the formation of the polyvinyl alcohol acetals of 5- (or 6-) hydroxyoctahydro-4,7-methanoindene-1- (or 2-) carboxaldehyde in fiber form, phosphoric, and sulfuric acids are preferred because they are non-volatile and are easily removed from the yarn at the end of the acetalization step by simple neutralization and washing. The catalysts are present in the solution to the extent of 0.05% to about 10% by weight with a preferred range being 0.5 to 5.0%.

The relative proportions of polyvinyl alcohol and the new hydroxy substituted carboxaldehyde, or simple acetals thereof, of this invention are not critical provided there is sufficient of the aldehyde and/or acetal to react with at least 25% of the hydroxyl groups. The new aldehyde or acetals thereof is normally used in the proportions of one-fourth to four moles per mole of polyvinyl alcohol, and preferably one-half to three moles per base mole (Bawn—The Chemistry of High Polymers, page 173) of polyvinyl alcohol. The "base mole" of a polymer such as polyvinyl alcohol is the unit weight of the recurring unit, in this case the —$CH_2$—CHOH— unit.

The acetalization reaction is carried out at a temperature and for a time necessary to acetalize 25 to 75% of the hydroxyl groups, corresponding to 46 to 138% weight gains, and preferably 30 to 50%, of the hydroxyl groups, corresponding to 55 to 92% weight gains. The desired end point is determined by measuring the increase in weight of the fibers as a result of the acetalization and simply calculating therefrom the percentage of hydroxyl groups reacted. At 50° C. the reaction may take one day, whereas at 150° C. the time required may be of the order of only one minute depending on other rate-controlling factors such as aldehyde, catalyst and water concentrations. Preferably, the temperature and other conditions are chosen so that the desired end point is reached in 5 to 90 minutes.

The reaction temperature is desirably at least 50° C. and it can be as high as desired short of decomposition of the reactants, a generally useful range being between 70 and 150° C. The reaction is carried out until at least 25%, and preferably at least 30%, of the hydroxyl groups in the polyvinyl alcohol have reacted, but it should be stopped before more than about 75% and in most cases before more than about 60% of the hydroxyl groups have reacted. The degree of acetalization may vary considerably. However, it has been found that within the limits indicated, these new polyvinylacetals of 5- (or 6-) hydroxyoctahydro-4,7-methanoindene-1- (or 2-) carboxaldehyde in fiber form exhibit improved resilience and higher softening points. The preferred products wherein from 30 to 50% of the hydroxyl groups are acetalized represent the best balance of desirable fiber properties such as higher modulus, good tenacity, increased resilience, higher softening point, and water insolubility or unmodified polyvinylalcohol fibers.

Generally, the acetalization solution contains a relatively small amount, based on the 5- (or 6-) hydroxyoctahydro-4,7-methanoindene-1- (or 2-) carboxaldehyde or its simple acetal being used, of a dialdehyde, e. g., succindialdehyde, or a dialdehyde precursor, i. e., a compound which under the aqueous acidic conditions employed, hydrolyzes with a formation of a dialdehyde, e. g., malondialdehyde tetraethyl acetal. It is preferred to use saturated aliphatic dialdehydes of three to five carbons and hydrocarbon but for the oxo oxygens, and precursors of such dialdehydes. The cyclic anhydrides of dihemiacetals of dialdehydes, which may also be regarded as cyclic monooxo five- or six-membered dialkoxysubstituted ethers wherein the two alkoxysubstituents are on the two carbons directly bonded to the ether oxygen, both of such carbons also carrying a single hydrogen, such as the 2,5-dialkoxytetrahydrofurans, are suitable dialdehyde precursors. The dialdehyde or dialdehyde precursor component can be present to the extent of 0.2 to 20% based on the 5- (or 6-) hydroxyoctahydro-4,7-methanoindene-1- (or 2-) carboxaldehyde or simple 5- (or 6-) hydroxyoctahydro-4,7-methanoindene-1- (or 2-) carboxaldehyde acetal being used and is preferably present in the amount of 0.4 to 4% on the same basis. The use of the dialdehyde precursor appears to be the use of the dialdehyde since the dialdehyde apparently is formed in situ during the reaction with the fiber.

The dialdehyde component serves to prevent excessive shrinkage of the yarn during the acetalization or subsequently when the yarn is subjected to boiling aqueous solutions. Excessive shrinkage gives yarns having undesirably low tenacities and moduli.

The dialdehyde or its precursor serves to crosslink the fibers to some extent. Experiments indicate that the yarn reacts with only 1 to 2% of its weight of crosslinking agent. As described elsewhere yarns which have been heat-treated at a sufficiently high temperature prior to activation in hot water and acetalization may be acetalized in the absence of any crosslinking agent. See Example V.

Good results are obtained when the acetalization solution is anhydrous or substantially so. In acetalization solutions containing no dialdehyde or other crosslinking agent small amounts of water of the order of 5% are tolerated without difficulty. However, if amounts of water greater than 10% are present, the fibers tend to shrink excessively.

Surprisingly in the presence of dialdehyde or dialdehyde precursor substantial amounts of water up to 25%, preferably not more than 20%, of the weight of the solution not only may be tolerated but actually give improved results. As described in the examples, the water speeds up the reaction and decreases or eliminates discoloration of the yarn.

The new hydroxy-substituted polycyclic aldehydes and their acetals of this invention are useful in many other fields. They are intermediates to other novel and useful compounds, such as the corresponding hydroxy carboxylic acid. They can be used as plasticizers, paper chemicals, polyester intermediates, and the like, the latter being especially true for the bis-acetals of dihydric alcohols. Polyvinyl alcohol acetals with these new aldehydes wherein more than 50% of the alcohol groups are acetalized are useful in preparing molded articles of high heat distortion temperatures which are steam and hot water resistant.

The term "dicyclopentenyl alcohol" in the claims refers to the acid catalyzed hydration product of dicyclopentadiene as obtained for example by Bruson in U. S. Patent 2,385,788 in Examples 1 to 6, inclusive. Bruson termed the product "hydroxydihydro-nor-dicyclopentadiene" whereas Bartlett et al., J. Am. Chem. Soc. 68, 6 (1946) term it the exo isomer of hydroxydihydrodicyclopentadiene.

The foregoing detailed description has been given for clearness of understanding only and no unnecessary limitations are to be understood therefrom. The invention is not limited to the exact details shown and described

13 for obvious modifications will occur to those skilled in the art.

What is claimed is:

1. A member of the class consisting of the mixture of claim 2 and the acetals thereof.

2. A mixture essentially comprising a hydroxyoctahydro-4,7-methanoindenecarboxaldehyde of the formula

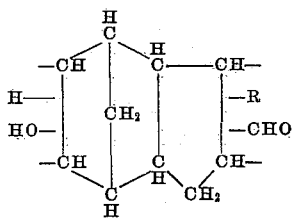

and the polymeric self hemi-acetal thereof, said mixture being obtained by reacting at elevated temperature and at elevated pressures of carbon monoxide and hydrogen in the presence of an oxo process catalyst, the dicyclopentenyl alcohol which is the acid catalyzed hydration product of dicyclopentadiene.

3. An acetal, with an alcohol, hydrocarbon but for the hydroxyl, of the hydroxyoctahydro-4,7-methanoindenecarboxaldehyde of claim 2, said acetal being obtained by reacting said alcohol at elevated temperature and at elevated pressures of carbon monoxide and hydrogen in the presence of an oxo process catalyst with the dicyclopentenyl alcohol which is the acid catalyzed hydration product of dicyclopentadiene.

4. A diethylene glycol acetal of the hydroxyoctahydro-4,7-methanoindenecarboxaldehyde of claim 2, said acetal being obtained by reacting diethylene glycol at elevated temperature and at elevated pressures of carbon monoxide and hydrogen in the presence of an oxo process catalyst with the dicyclopentenyl alcohol which is the acid catalyzed hydration product of dicyclopentadiene.

5. The acetal of an alkanol of up to three carbons of the hydroxyoctahydro-4,7-methanoindenecarboxaldehyde of claim 2, said acetal being obtained by reacting said alkanol at elevated temperature and at elevated pressures of carbon monoxide and hydrogen in the presence of an oxo process catalyst with the dicyclopentenyl alcohol which is the acid catalyzed hydration product of dicyclopentadiene.

6. The polyvinyl alcohol acetal obtained by reacting polyvinyl alcohol with the mixture essentially comprising a hydroxyoctahydro-4,7-methanoindenecarboxaldehyde of the formula

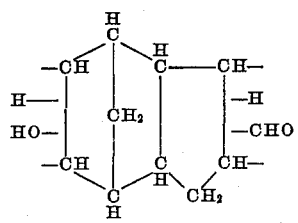

and the polymeric self hemi-acetal thereof, said mixture being obtained by reacting, at elevated temperature and at elevated pressures of carbon monoxide and hydrogen in the presence of an oxo process catalyst, the dicyclopentenyl alcohol which is the acid catalyzed hydration product of dicyclopentadiene.

7. A shaped object, film or fiber, having one dimension large and another dimension small, consisting essentially of polyvinyl alcohol having 30 to 50% of its hydroxyls acetalized by reaction with the mixture essentially comprising a hydroxyoctahydro-4,7-methanoindenecarboxaldehyde of the formula

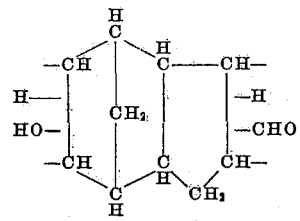

and the polymeric self hemi-acetal thereof, said mixture being obtained by reacting, at elevated temperature and at elevated pressures of carbon monoxide and hydrogen in the presence of an oxo process catalyst, the dicyclopentenyl alcohol which is the acid catalyzed hydration product of dicyclopentadiene.

8. A filament consisting essentially of polyvinyl alcohol having 30 to 50% of its hydroxyls acetalized by reaction with the mixture essentially comprising a hydroxyoctahydro-4,7-methanoindenecarboxaldehyde of the formula

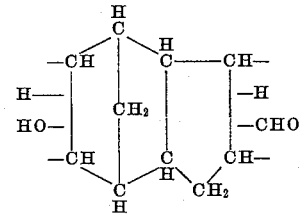

and the polymeric self hemi-acetal thereof, said mixture being obtained by reacting, at elevated temperature and at elevated pressures of carbon monoxide and hydrogen in the presence of an oxo process catalyst, the dicyclopentenyl alcohol which is the acid catalyzed hydration product of dicyclopentadiene.

9. Process for the preparation of polyvinyl alcohol filaments having a high degree of resilience, a moisture absorption comparable to that of cotton, and an adequate dyeability which comprises heating a polyvinyl alcohol filament in an aqueous solution containing an acid acetalization catalyst, a dialdehyde, up to 25% water, and a member of the class consisting of the mixture essentially comprising a hydroxyoctahydro-4,7-methanoindenecarboxaldehyde of the formula

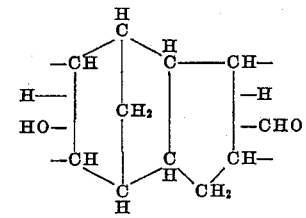

and the polymeric self hemi-acetal thereof, said mixture being obtained by reacting, at elevated temperature and at elevated pressures of carbon monoxide and hydrogen in the presence of an oxo process catalyst, the dicyclopentenyl alcohol which is the acid catalyzed hydration product of dicyclopentadiene and the acetals of such hydroxyaldehyde mixture.

10. Process for the preparation of polyvinyl alcohol filaments having a high degree of resilience, a moisture absorption comparable to that of cotton, and an adequate dyeability which comprises heating a polyvinyl alcohol filament in an aqueous solution containing an acid acetalization catalyst, a dialdehyde, formed in situ, up to 25% water, and a member of the class consisting of the mixture essentially comprising a hydroxyoctahydro-4,7-methanoindenecarboxaldehyde of the formula

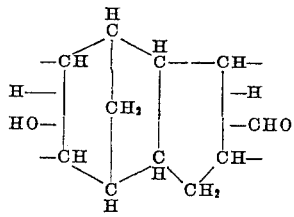

and the polymeric self hemi-acetal thereof, said mixture being obtained by reacting, at elevated temperature and at elevated pressures of carbon monoxide and hydrogen in the presence of an oxo process catalyst, the dicyclopentenyl alcohol which is the acid catalyzed hydration product of dicyclopentadiene and the acetals of such hydroxyaldehyde mixture.

References Cited in the file of this patent
UNITED STATES PATENTS

| | | |
|---|---|---|
| 2,385,788 | Bruson | Oct. 2, 1945 |
| 2,462,448 | Whitman | Feb. 22, 1949 |
| 2,616,928 | Gilbert | Nov. 4, 1952 |
| 2,662,922 | Kleiman | Dec. 15, 1953 |
| 2,668,858 | Miescher | Feb. 9, 1954 |
| 2,694,730 | Ipatieff | Nov. 16, 1954 |

OTHER REFERENCES

Bartlett et al.: J. Amer. Chem. Soc., vol. 68, pp. 6 to 8, 1946.